United States Patent
Saito et al.

(10) Patent No.: US 10,643,649 B2
(45) Date of Patent: May 5, 2020

(54) HEAT-ASSISTED MAGNETIC RECORDING MEDIUM AND MAGNETIC STORAGE APPARATUS

(71) Applicants: SHOWA DENKO K.K., Tokyo (JP); TOHOKU UNIVERSITY, Miyagi (JP)

(72) Inventors: Shin Saito, Miyagi (JP); Takayuki Fukushima, Chiba (JP); Lei Zhang, Chiba (JP); Hisato Shibata, Chiba (JP); Takehiro Yamaguchi, Chiba (JP); Chen Xu, Chiba (JP); Tetsuya Kanbe, Chiba (JP); Tomoo Shige, Chiba (JP); Kazuya Niwa, Chiba (JP); Atsushi Hashimoto, Chiba (JP)

(73) Assignees: SHOWA DENKO K.K., Tokyo (JP); TOHOKU UNIVERSITY, Miyagi (JP)

( * ) Notice: Subject to any disclaimer, the term of this patent is extended or adjusted under 35 U.S.C. 154(b) by 0 days.

(21) Appl. No.: 16/448,187

(22) Filed: Jun. 21, 2019

(65) Prior Publication Data
US 2020/0005823 A1     Jan. 2, 2020

(30) Foreign Application Priority Data

Jun. 27, 2018 (JP) .................. 2018-121662

(51) Int. Cl.
G11B 5/73 (2006.01)
G11B 5/82 (2006.01)
G11B 5/00 (2006.01)

(52) U.S. Cl.
CPC .......... *G11B 5/7375* (2019.05); *G11B 5/7369* (2019.05); *G11B 5/82* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 9,818,441 B2 | 11/2017 | Kanbe et al. | |
| 2018/0182421 A1* | 6/2018 | Fukushima et al. | G11B 5/667 |
| 2018/0204591 A1* | 7/2018 | Fukushima et al. | G11B 5/7325 |
| 2018/0211688 A1* | 7/2018 | Fukushima et al. | G11B 5/7325 |
| 2019/0392860 A1* | 12/2019 | Zhang et al. | G11B 5/7369 |

FOREIGN PATENT DOCUMENTS

JP     2011-165232     8/2011

* cited by examiner

*Primary Examiner* — Craig A. Renner
(74) *Attorney, Agent, or Firm* — IPUSA, PLLC

(57) ABSTRACT

A heat-assisted magnetic recording medium includes: a substrate; an underlayer; and a magnetic layer including an alloy having an $L1_0$ structure. The substrate, the underlayer, and the magnetic layer are stacked in the recited order. The underlayer includes a first underlayer. The first underlayer includes magnesium oxide and one or more compounds selected from the group consisting of vanadium oxide, zinc oxide, tin oxide, vanadium nitride, and vanadium carbide, and a total content of the one or more compounds is in a range of 45 mol % to 70 mol %.

5 Claims, 3 Drawing Sheets

HEAT-ASSISTED MAGNETIC RECORDING MEDIUM AND MAGNETIC STORAGE APPARATUS

CROSS-REFERENCE TO RELATED APPLICATIONS

This application is based on and claims priority to Japanese Patent Application No. 2018-121662 filed on Jun. 27, 2018, the entire contents of which are incorporated herein by reference.

BACKGROUND OF THE INVENTION

1. Field of the Invention

The disclosures herein generally relate to a heat-assisted magnetic recording medium and a magnetic storage apparatus.

2. Description of the Related Art

A heat-assisted recording method, by which a surface is locally heated by irradiating a magnetic recording medium with near-field light or the like such that writing on the magnetic recording medium is performed by reducing the magnetic coercivity of the magnetic recording medium, is known as a next-generation recording method that can realize an areal recording density of approximately 1 Tbit/inch$^2$. Using the heat-assisted recording method, it is possible to easily write on a magnetic recording medium having a coercivity of several tens of kOe at ambient temperature by the recording magnetic field of a magnetic head. Therefore, a high Ku material whose crystal magnetic anisotropic constant Ku is on the order of $10^6$ J/m$^3$ can be used for a magnetic layer. As a result, while maintaining the thermal stability of the magnetic layer, the grain size of magnetic grains can be reduced to 6 nm or less. As high Ku materials, alloys such as FePt alloys (Ku≈7×10$^6$ J/m$^3$) having an L1$_0$ structure and CoPt alloys (Ku≈5×10$^6$ J/m$^3$) are known.

In order to enhance the areal recording density of a heat-assisted magnetic recording medium, it is necessary to enhance the coercivity of the heat-assisted magnetic recording medium by enhancing the crystal orientation of the magnetic layer, making the magnetic grains finer, and reducing exchange coupling between the magnetic grains.

In a case where a FePt alloy having an L1$_0$ structure is used as the magnetic layer, the magnetic layer is required to be (001) oriented in order to enhance the crystal orientation of the magnetic layer. For this reason, for an underlayer, it is preferable to use (100) oriented MgO. Here, the (100) plane of MgO lattice-matches the (001) plane of a FePt alloy having an L1$_0$ structure.

Also, in order to make magnetic grains finer and reduce exchange coupling between the magnetic grains, it is described that an underlayer is formed that includes MgO as a main component and includes at least one kinds of oxide selected from SiO$_2$, TiO$_2$, Cr$_2$O$_3$, Al$_2$O$_3$, Ta$_2$O$_5$, ZrO$_2$, Y$_2$O$_3$, CeO$_2$, MnO, TiO, and ZnO (for example, see Patent Document 1).

RELATED-ART DOCUMENTS

Patent Documents

[Patent Document 1] Japanese Laid-Open Patent Publication No. 2011-165232

However, it is desired to further enhance the areal recording density of a heat-assisted magnetic recording medium. That is, it is desired to further enhance the coercivity of the heat-assisted magnetic recording medium.

It is an object of one aspect of the present invention to provide a heat-assisted magnetic recording medium having excellent coercivity.

SUMMARY OF THE INVENTION (1) A heat-assisted magnetic recording medium includes: a substrate; an underlayer; and a magnetic layer including an alloy having an L1$_0$ structure. The substrate, the underlayer, and the magnetic layer are stacked in the recited order. The underlayer includes a first underlayer. The first underlayer includes magnesium oxide and one or more compounds selected from the group consisting of vanadium oxide, zinc oxide, tin oxide, vanadium nitride, and vanadium carbide, and a total content of the one or more compounds is in a range of 45 mol % to 70 mol %.

(2) The heat-assisted magnetic recording medium according to (1), wherein the first underlayer is in contact with the magnetic layer.

(3) The heat-assisted magnetic recording medium according to (1), wherein the underlayer includes a second subsurface layer, and wherein the second underlayer includes magnesium oxide and is formed between the substrate and the first underlayer.

(4) The heat-assisted magnetic recording medium according to (1), wherein the underlayer includes a second underlayer, and wherein the second underlayer includes a substance having a BCC structure or a B2 structure, is formed between the first underlayer and the magnetic layer, and is in contact with the first underlayer.

(5) A magnetic storage apparatus includes: the heat-assisted magnetic recording medium according to (1).

According to one aspect of the present invention, it is possible to provide a heat-assisted magnetic recording medium having excellent coercivity.

DESCRIPTION OF THE PREFERRED EMBODIMENTS

Figure 1:
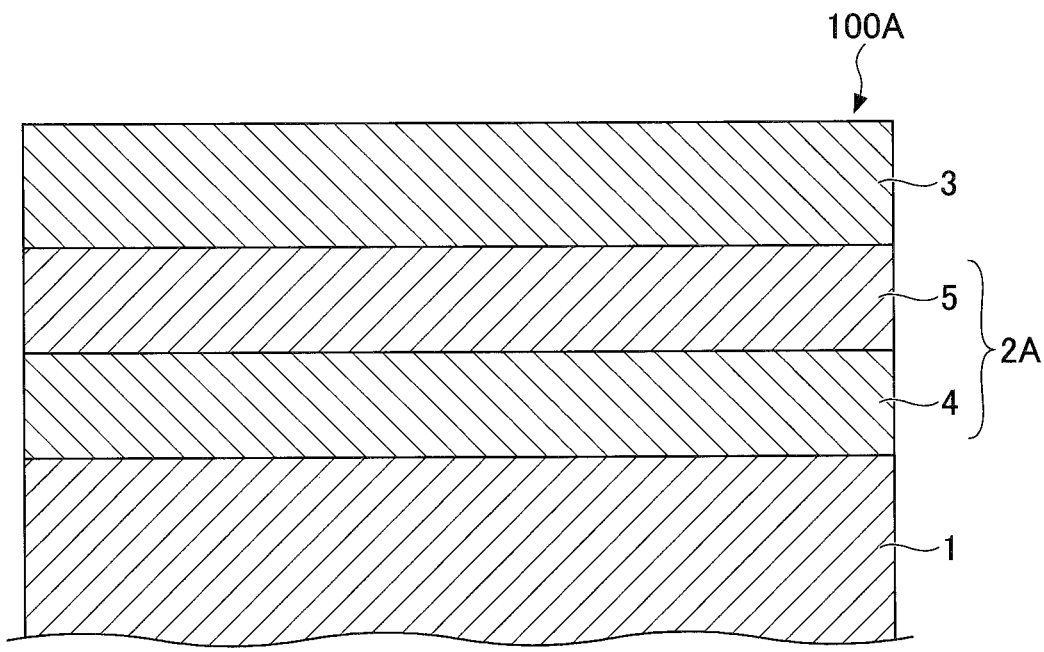
FIG. 1 is a cross-sectional view illustrating an example of a layer structure of a heat-assisted magnetic recording medium according to an embodiment.

In the following, an embodiment of the present invention will be described with reference to the accompanying drawings. Note that in the drawings used in the following description, portions that are features may be enlarged in order to make the features easy to understand for convenience, and the dimensional ratios of respective components may not be the same as in the drawings.

(Heat-Assisted Magnetic Recording Medium)

FIG. 1 is a schematic diagram illustrating an example of a layer structure of a heat-assisted magnetic recording medium 100A according to an embodiment.

The heat-assisted magnetic recording medium 100A includes a substrate 1, an underlayer 2A, and a magnetic layer 3 including an alloy having an $L1_0$ structure in this order. Here, in the underlayer 2A, a second underlayer 4 and a first underlayer 5 are stacked in this order. Also, the first underlayer 5 includes magnesium oxide and one or more compounds selected from the group consisting of vanadium oxide, zinc oxide, tin oxide, vanadium nitride, and vanadium carbide. The total content of the above described one or more compounds is in a range of 45 mol % to mol %. Further, the second underlayer 4 includes magnesium oxide.

By having the above described structure, in the heat-assisted magnetic recording medium 100A, the (001) orientation of the magnetic layer 3 including an alloy having an $L1_0$ structure is enhanced. In addition, in the heat-assisted magnetic recording medium 100A, the magnetic grains contained in the magnetic layer 3 are made finer and exchange coupling between the magnetic grains is reduced. As a result, the coercivity of the heat-assisted magnetic recording medium 100A is enhanced.

Here, because the second underlayer 4 comprising magnesium oxide is (100)-oriented, the first underlayer 5 including magnesium oxide having a NaCl type structure is (100)-oriented. As a result, the (100) plane of the first underlayer 5 lattice-matches the (001) plane of the magnetic layer 3 having an $L1_0$ type crystal structure, and the (001) orientation of the magnetic layer 3 is enhanced.

Magnesium oxide grains contained in the first underlayer 5 are made finer by the above-described one or more compounds, which are contained in the first underlayer 5. Then, "One by one growth" is promoted in which one magnetic crystal grain constituting the magnetic layer 3 grows on one magnesium oxide crystal grain. As a result, the (001) orientation of the magnetic layer 3 is enhanced. Also, the magnetic grains contained in the magnetic layer 3 can be made finer, separation between the magnetic grains can be prompted, and exchange coupling between the magnetic grains can be reduced.

Here, because the above-described "One by one growth" is promoted, it is preferable that the first underlayer 5 is in contact with the magnetic layer 3, but the first underlayer 5 may not be in contact with the magnetic layer 3.

Note that, if vanadium, zinc, or tin in the metal state is used instead of the above-described one or more compounds, when being in contact with magnetic grains, at least portion of vanadium, zinc, or tin in the metal state diffuses into the magnetic grains and the magnetism of the magnetic grains decreases.

The content of the above-described one or more compounds in the first underlayer 5 is in a range of 45 mol % to 70 mol %, and is preferably in a range of 45 mol % to 55 mol %. If the content of the above-described one or more compounds in the first underlayer 5 is less than 45 mol %, the magnesium oxide grains in the first underlayer 5 cannot be sufficiently made finer. If the content of the above-described one or more compounds exceeds 70 mol %, the variance of the grain diameters of the magnesium oxide grains included in the first underlayer 5 increases and the (100) orientation of the first underlayer 5 decreases.

The content of magnesium oxide in the first underlayer 5 is preferably greater than or equal to 30 mol %, and is more preferably greater than or equal to 45 mol %. The (100) orientation of the first underlayer 5 is enhanced when the content of magnesium oxide in the first underlayer 5 is greater than or equal to 30 mol %.

The thickness of the first underlayer 5 is preferably in a range of 0.2 nm to 2 nm, and is more preferably in a range of 0.5 nm to 1.5 nm. When the thickness of the first underlayer 5 is 0.2 nm or more, magnesium oxide grains contained in the first underlayer 5 can be further miniaturized, and when the thickness of the first underlayer 5 is 2 nm or less, the heat dissipation property when writing information to the heat-assisted magnetic recording medium 100A can be further enhanced.

The content of magnesium oxide in the second underlayer 4 is preferably greater than or equal to 50 mol %, and is more preferably greater than or equal to 70 mol %. When the content of magnesium oxide in the second underlayer 4 is 50 mol % or more, the (100) orientation of the second underlayer 4 is enhanced.

An alloy having an $L1_0$ structure contained in the magnetic layer 3 is preferably a FePt magnetic alloy or a CoPt magnetic alloy.

The magnetic layer 3 preferably includes a grain boundary segregation material for magnetic grains. Thus, the magnetic layer 3 has a granular structure in which the magnetic grains having an $L1_0$ structure are divided by the grain boundary segregation material.

As the grain boundary segregation material for magnetic grains, an oxide such as silicon dioxide ($SiO_2$), titanium dioxide ($TiO_2$), chromium oxide ($Cr_2O_3$), aluminum oxide ($Al_2O_3$), tantalum oxide ($Ta_2O_5$), zirconium oxide ($ZrO_2$), yttrium oxide ($Y_2O_3$), cerium oxide ($CeO_2$), manganese oxide (MnO), titanium monoxide (TiO), or zinc oxide (ZnO), carbon (C), a carbide such as vanadium carbide (VC), a nitride such as vanadium nitride (VN), boron nitride (BN), titanium nitride (TiN), or the like may be used. Two or more of these may be used in combination as the grain boundary segregation material for magnetic grains.

It is preferable that a protective layer is formed on the magnetic layer 3 in the heat-assisted magnetic recording medium 100A.

A method of forming the protective layer is not limited to a particular method. For example, a RF-CVD (Radio Frequency-Chemical Vapor Deposition) method that decomposes a source gas made of hydrocarbon by high-frequency plasma, an IBD (Ion Beam Deposition) method that ionizes a source gas by electrons emitted from a filament, a FCVA (Filtered Cathodic Vacuum Arc) method that uses a solid carbon target without using a source gas, or the like may be used to form the protective layer.

The thickness of the protective layer is preferably 1 nm or more and 6 nm or less. The floating properties of the magnetic head become satisfactory when the thickness of the protective layer is 1 nm or more. Also, a magnetic spacing decreases and the SNR of the heat-assisted magnetic recording medium 100A is enhanced when the thickness of the protective layer is 6 nm or less.

In the heat-assisted magnetic recording medium 100A, a lubricant layer including a perfluoropolyether-based lubricant may be further formed on the protective layer.

Figure 2:
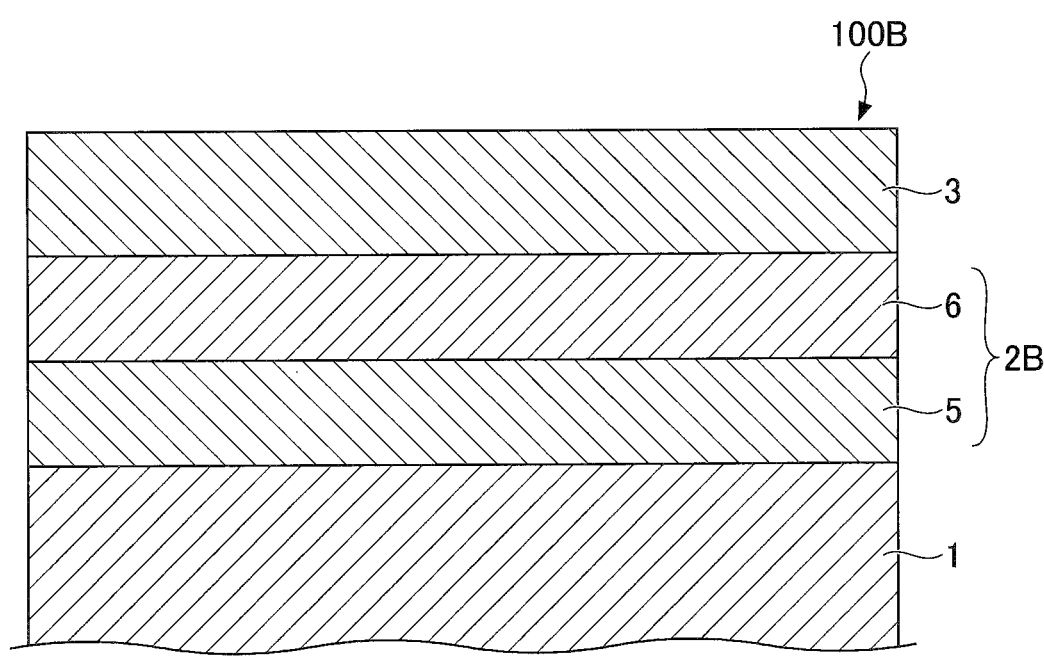
FIG. 2 is a cross-sectional view illustrating another example of a layer structure of a heat-assisted magnetic recording medium according to the embodiment.

FIG. 2 illustrates another example of a layer configuration of a heat-assisted magnetic recording medium 100B according to the present embodiment.

The heat-assisted magnetic recording medium 100B has a configuration similar to that of the heat-assisted magnetic recording medium 100A with the exception that an underlayer 2B is formed instead of the underlayer 2A.

Note that in the heat-assisted magnetic recording medium 100B, elements that are the same as those of the heat-assisted magnetic recording medium 100A are referred to by the same reference numerals, and duplicate descriptions may be omitted as appropriate.

The underlayer 2B has a configuration the same as that of the underlayer 2A with the exception that a second underlayer 4 is not formed and a second underlayer 6 is formed between the first underlayer 5 and the magnetic layer 3.

The second underlayer 6 includes a substance having a BCC structure or a B2 structure.

Here, because the first underlayer 5 including magnesium oxide having a NaCl type structure is (100)-oriented, the second underlayer 6 including the substance having the BCC structure or the B2 structure is (100)-oriented. As a result, the (100) plane of the second underlayer 6 lattice-matches the (001) plane of the magnetic layer 3 having an $L1_0$ structure, and the (001) orientation of the magnetic layer 3 is enhanced.

Magnesium oxide grains contained in the first underlayer 5 are made finer by the above-described one or more compounds, which are contained in the first underlayer 5. Then, "One by one growth" is promoted in which one crystal grain of the substance having the BCC structure or the B2 structure constituting the second underlayer 6 heteroepitaxially grows on one magnesium oxide crystal grain. Also, "One by one growth" is promoted in which one magnetic crystal grain constituting the magnetic layer 3 grows on one crystal grain of the substance having the BCC structure or the B2 structure. As a result, the (001) orientation of the magnetic layer 3 is enhanced. Also, the magnetic grains contained in the magnetic layer 3 can be made finer, separation between the magnetic grains can be prompted, and exchange coupling between the magnetic grains can be reduced.

Examples of the substance having the BCC structure included in the second underlayer 6 include Cr, a Cr—Mn alloy, a Cr—Mo alloy, a Cr—W alloy, a Cr—V alloy, a Cr—Ti alloy, a Cr—Ru alloy, and the like.

Examples of the substance having the B2 structure included in the second underlayer 6 include a Ru—Al alloy, a Ni—Al alloy, and the like.

The content of the substance having the BCC or B2 structure in the second underlayer 6 is preferably greater than or equal to 60 mol %, and is more preferably greater than or equal to 80 mol %. The (100) orientation of the second underlayer 6 is improved when the content of the substance having the BCC structure or the B2 structure in the second underlayer 6 is greater than or equal to 60 mol %.

(Magnetic Storage Apparatus)

A magnetic storage apparatus according to the present embodiment is not limited to a particular structure, as long as the magnetic storage apparatus includes a heat-assisted magnetic recording medium according to the embodiment described above.

The magnetic storage apparatus according to the present embodiment includes, for example, a magnetic recording medium drive unit for rotating a heat-assisted magnetic recording medium, a magnetic head provided with a near field light generation element on its tip, a magnetic head drive unit for moving the magnetic head, and a recording and reproducing signal processing system.

Also, the magnetic head includes, for example, a laser light generation unit for heating the heat-assisted magnetic recording medium, and a waveguide for guiding laser light generated from the laser light generation unit to the near field light generation element.

Figure 3:
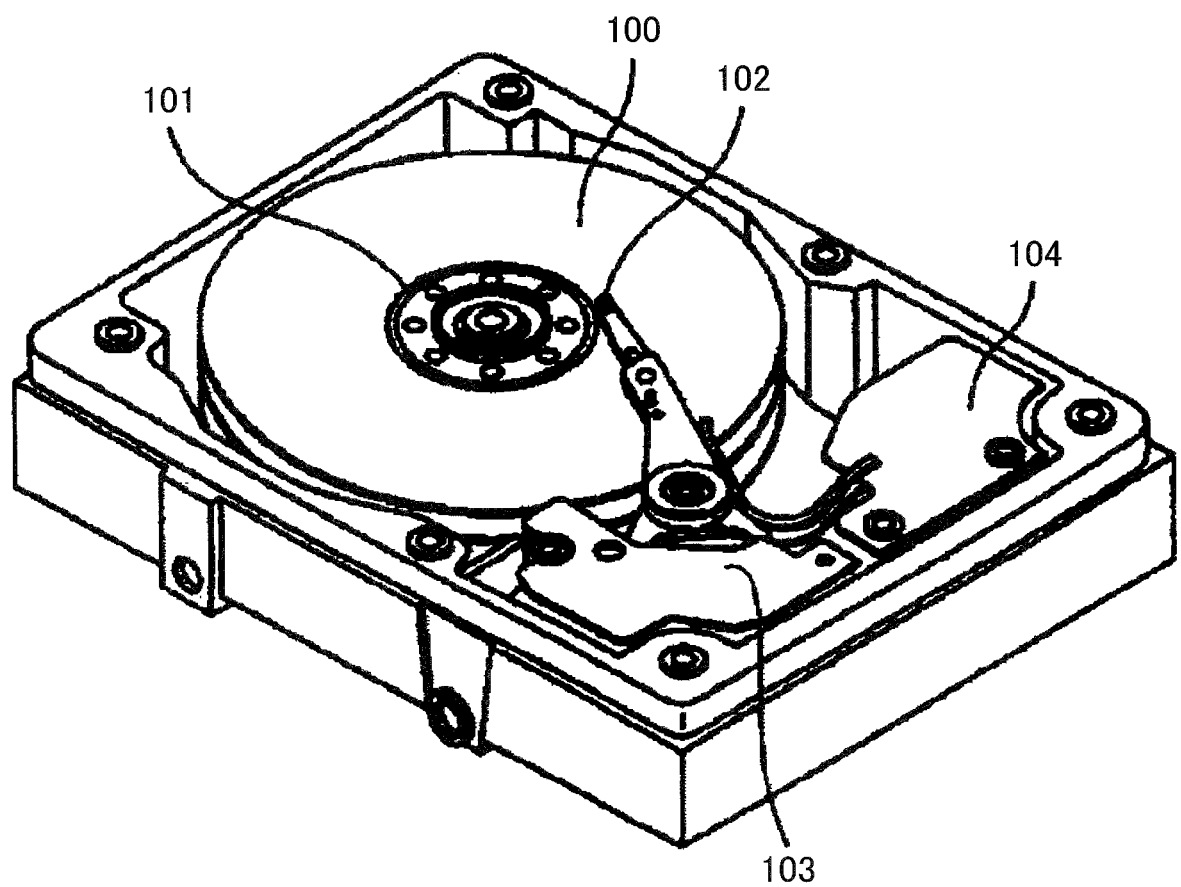
FIG. 3 is a perspective view illustrating an example of a magnetic storage apparatus according to the embodiment.

FIG. 3 illustrates an example of a magnetic storage apparatus according to the present embodiment.

The magnetic storage apparatus illustrated in FIG. 3 includes a heat-assisted magnetic recording medium 100 (100A or 100B), a magnetic recording medium drive unit 101 for rotating the heat-assisted magnetic recording medium 100, a magnetic head 102, a magnetic head drive unit 103 for moving the magnetic head 102, and a recording and reproducing signal processing system 104.

Figure 4:
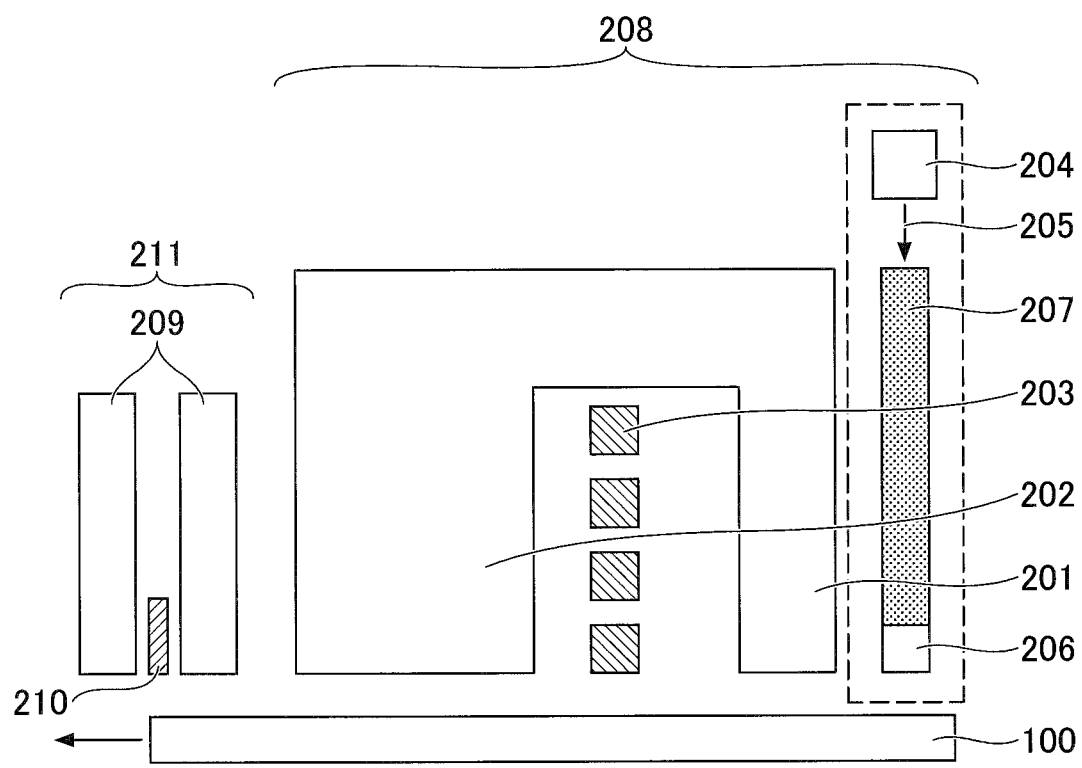
FIG. 4 is a schematic diagram illustrating an example of a magnetic head used in the magnetic storage apparatus of FIG. 3.

FIG. 4 illustrates an example of the magnetic head 102.

The magnetic head 102 includes a recording head 208 and a reproducing head 211.

The recording head 208 includes a main magnetic pole 201, an auxiliary magnetic pole 202, a coil 203 for generating a magnetic field, a laser diode (LD) 204, which serves as a laser light generation unit, and a waveguide 207 for transmitting laser light 205 generated at the LD 204 to a near field light generation element 206.

The reproducing head 211 includes a reproducing element 210 sandwiched by shields 209.

EXAMPLES

In the following, Examples of the present invention will be described. Note that the present invention is not limited to Examples described below, and various variations and modifications may be made without departing from the scope of the present invention.

Examples 1 to 6 and Comparative Examples 1 to 3

On a heat-resistant glass substrate, an alloy layer (underlayer) of Cr-50 at % Ti having a thickness of 50 nm was formed and heated to 250° C. Thereafter, a Cr layer (underlayer) having a thickness of 10 nm was formed. Thereafter, a Mo layer (underlayer) having a thickness of 1 nm, a MgO layer (second underlayer) having a thickness of 1 nm, and a first underlayer having a thickness of 0.3 nm were formed in this order and heated to 520° C. Thereafter, a layer (magnetic layer) of (Fe-55 at % Pt)-40 mol % C having a thickness of 3 nm and a layer (magnetic layer) of (Fe-55 at % Pt)-40 mol % $SiO_2$ having a thickness of 3 nm were formed in this order to obtain a heat-assisted magnetic recording medium.

Here, the materials constituting the first underlayers are indicated in Table 1.

For example, MgO-50 mol % $ZnO_2$ means that the content of MgO is 50 mol % and the content of $ZnO_2$ is 50 mol %.

(Average Grain Diameter <D> of MgO Grains and Variance σ/<D> of Grain Diameters Normalized by Average Grain Diameter)

A TEM was used to measure <D> and σ/<D> of MgO grains included in the first underlayer for each of Examples 1 to 6 and Comparative Examples 1 to 2.

((001) Orientation Δθ50 of Magnetic Grains>

An X-ray diffraction (XRD) apparatus (manufactured by Philips) was used to measure Δθ50 of magnetic grains contained in the magnetic layer for each of Examples 1 to 6 and Comparative Examples 1 to 2.

(Coercivity Hc of Heat-Assisted Magnetic Recording Medium)

Using a Kerr magnetic measurement apparatus (manufactured by NEOARK CORPORATION), Hc of the heat-assisted magnetic recording medium was measured for each of Examples 1 to 6 and Comparative Examples 1 to 2.

Table 1 indicates the measurement results of <D> and σ/<D> of the MgO grains, Δθ50 of the magnetic grains, and Hc of the heat-assisted magnetic recording medium for each of Examples 1 to 6 and Comparative Examples 1 to 3. Note that with respect to Δθ50 of the magnetic grains, as the value is lower, the orientation (001) is higher.

TABLE 1

| | FIRST UNDERLAYER | | | MAGNETIC LAYER | |
| --- | --- | --- | --- | --- | --- |
| | COMPOSITION | <D> [nm] OF MgO GRAINS | σ/<D> OF MgO GRAINS | Δ θ 50 OF MAGNETIC GRAINS | Hc [kOe] |
| E1 | MgO—50 mol % ZnO | 5.1 | 0.19 | 6.5 | 34.5 |
| E2 | MgO—65 mol % ZnO | 4.8 | 0.21 | 6.7 | 35.8 |
| E3 | MgO—50 mol % V$_2$O$_3$ | 5.2 | 0.22 | 6.8 | 33.6 |
| E4 | MgO—50 mol % SnO$_2$ | 5.3 | 0.20 | 7.0 | 32.0 |
| E5 | MgO—50 mol % VN | 4.6 | 0.21 | 6.9 | 32.7 |
| E6 | MgO—50 mol % VC | 4.7 | 0.23 | 7.2 | 31.9 |
| CE1 | MgO—18 mol % SiO$_2$ | 6.2 | 0.19 | 8.1 | 23.4 |
| CE2 | MgO—75 mol % ZnO | 4.8 | 0.31 | 9.4 | 18.2 |
| CE3 | MgO—30 mol % ZnO | — | — | — | — |

From Table 1, it is apparent that, for each of Examples 1 to 6, the heat-assisted magnetic recording medium has high Hc.

Conversely, in the heat-assisted recording medium of Comparative Example 1, because the first underlayer does not contain V$_2$O$_3$, ZnO, SnO$_2$, VN, or VC, <D> of the MgO grains and θ50 of the magnetic grains are large and Hc is small.

In the heat-assisted recording medium of Comparative Example 2, because the content of ZnO in the first underlayer is 75 mol %, σ/<D> of the MgO grains and θ50 of the magnetic grains are large and Hc is small.

In the heat-assisted recording medium of Comparative Example 3, because the content of ZnO in the first underlayer is 30 mol %, MgO grains were not present. Therefore, measurement of θ50 and Hc of the magnetic grains was omitted.

Examples 7 to 12 and Comparative Examples 4 to 6

On a heat-resistant glass substrate, an alloy layer (underlayer) of Cr-50 at % Ti having a thickness of 50 nm, an alloy layer (soft magnetic underlayer) of Co-20 at % Ta-5 at % B having a thickness of 25 nm, and a first underlayer having a thickness of 0.3 nm were formed in this order and then heated to 250° C. Thereafter, a Cr layer (second underlayer) having a thickness of 10 nm, a Mo layer (underlayer) having a thickness of 1 nm, and a MgO layer (underlayer) having a thickness of 1 nm were formed and then heated to 520° C. Thereafter, a layer (magnetic layer) of (Fe-55 at % Pt)-40 mol % C having a thickness of 3 nm and a layer (magnetic layer) of (Fe-55 at % Pt)-40 mol % SiO$_2$ having a thickness of 3 nm were formed in this order to obtain a heat-assisted magnetic recording medium.

((200) Orientation Δθ50 of Cr>

An X-ray diffraction (XRD) apparatus (manufactured by Philips) was used to measure Δθ50 of Cr included in the second underlayer for each of Examples 7 to 12 and Comparative Examples 4 to 5.

Table 2 indicates the measurement results of <D> and σ/<D> of the MgO grains, Δθ50 of Cr and the magnetic grains, and Hc of the heat-assisted magnetic recording medium for each of Examples 7 to 12 and Comparative Examples 4 to 6. Note that with respect to Δθ50 of Cr, as the value is lower, the orientation (200) is higher.

TABLE 2

| | FIRST UNDERLAYER | | | SECOND UNDERLAYER | MAGNETIC LAYER Δ θ 50 OF | |
| --- | --- | --- | --- | --- | --- | --- |
| | COMPOSITION | <D> [nm] OF MgO GRAINS | σ/<D> OF MgO GRAINS | Δ θ 50 OF Cr | MAGNETIC GRAINS | Hc [kOe] |
| E7 | MgO—50 mol % ZnO | 5.1 | 0.19 | 4.6 | 6.7 | 30.5 |
| E8 | MgO—65 mol % ZnO | 4.8 | 0.21 | 4.7 | 6.9 | 31.6 |
| E9 | MgO—50 mol % V$_2$O$_3$ | 5.2 | 0.22 | 6.8 | 6.9 | 29.8 |
| E10 | MgO—50 mol % SnO$_2$ | 5.3 | 0.20 | 6.1 | 7.1 | 28.3 |
| E11 | MgO—50 mol % VN | 4.6 | 0.21 | 7.5 | 7.1 | 29.0 |
| E12 | MgO—50 mol % VC | 4.7 | 0.23 | 5.8 | 7.4 | 28.2 |
| CE4 | MgO—18 mol % SiO$_2$ | 6.2 | 0.19 | 8.1 | 9.6 | 16.6 |
| CE5 | MgO—75 mol % ZnO | 4.8 | 0.31 | 9.4 | 10.1 | 15.1 |
| CE6 | MgO—30 mol % ZnO | — | — | — | — | — |

From Table 2, it is apparent that, for each of Examples 7 to 12, the heat-assisted magnetic recording medium has high Hc.

Conversely, in the heat-assisted recording medium of Comparative Example 4, because the first underlayer does not contain V$_2$O$_3$, ZnO, SnO$_2$, VN, or VC, <D> of the MgO grains and θ50 of Cr and the magnetic grains are large and Hc is small.

In the heat-assisted recording medium of Comparative Example 5, because the content of ZnO in the first underlayer is 75 mol %, σ/<D> of the MgO grains and θ50 of Cr and the magnetic grains are large and Hc is small.

In the heat-assisted recording medium of Comparative Example 6, because the content of ZnO in the first underlayer is 30 mol %, MgO grains were not present. Therefore, measurement of θ50 and Hc of Cr and the magnetic grains was omitted.

What is claimed is:
1. A heat-assisted magnetic recording medium comprising:
   a substrate;
   an underlayer; and
   a magnetic layer including an alloy having an L1$_0$ structure,
   wherein the substrate, the underlayer, and the magnetic layer are stacked in the recited order,
   wherein the underlayer includes a first underlayer, and
   wherein the first underlayer includes magnesium oxide and one or more compounds selected from the group consisting of vanadium oxide, zinc oxide, tin oxide, vanadium nitride, and vanadium carbide, and a total content of the one or more compounds is in a range of 45 mol % to 70 mol %.

2. The heat-assisted magnetic recording medium according to claim 1, wherein the first underlayer is in contact with the magnetic layer.

3. The heat-assisted magnetic recording medium according to claim 1,
   wherein the underlayer further includes a second subsurface layer, and
   wherein the second underlayer includes magnesium oxide and is formed between the substrate and the first underlayer.

4. The heat-assisted magnetic recording medium according to claim 1,
   wherein the underlayer further includes a second underlayer, and
   wherein the second underlayer includes a substance having a BCC structure or a B2 structure, is formed between the first underlayer and the magnetic layer, and is in contact with the first underlayer.

5. A magnetic storage apparatus comprising:
   the heat-assisted magnetic recording medium according to claim 1.

\* \* \* \* \*